United States Patent [19]
Stoltz

[11] 3,920,345
[45] Nov. 18, 1975

[54] T-SECTION ASSEMBLY CONNECTOR
[76] Inventor: Jean Stoltz, rue de l'Eglise, 77 Ury, France
[22] Filed: May 30, 1973
[21] Appl. No.: 365,097

[52] U.S. Cl. ................ 403/406; 403/170; 403/217; 403/382; 403/403
[51] Int. Cl.² .... B25G 3/00; F16B 2/02; F16D 1/00; F16G 11/00
[58] Field of Search .......... 403/170, 173, 217, 174, 403/178, 181, 182, 187, 205, 294, 295, 298, 346, 382, 403, 406; 52/726, 758 R, 758 F, 677, 685, 665

[56] References Cited
UNITED STATES PATENTS

| | | | |
|---|---|---|---|
| 1,272,809 | 7/1918 | Johnson | 403/346 X |
| 1,662,728 | 3/1928 | Wait | 403/173 |
| 1,688,949 | 10/1928 | Wait | 403/173 |
| 3,342,457 | 9/1967 | Boborowski | 403/362 X |

Primary Examiner—Werner H. Schroeder
Assistant Examiner—Wayne L. Shedd
Attorney, Agent, or Firm—Lane, Aitken, Dunner & Ziems

[57] ABSTRACT

T-Section device involving a single assembly element permitting multiple mounting combinations. It includes T-section whose blades, on one of its faces, has several antiwarping retaining grooves corresponding to those of the assembly element on which said grooved blade is engaged, said blade being fastened to the assembly element by two dish screws with six hollow surfaces. Said assembly element can assemble as many as four section pieces simultaneously. The invention can be used for making up miscellaneous shelves, furniture items, presentation elements, decorations, etc.

6 Claims, 11 Drawing Figures

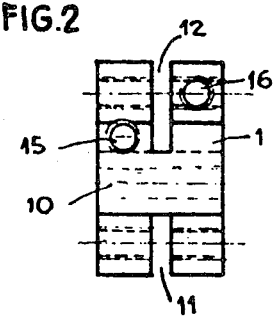
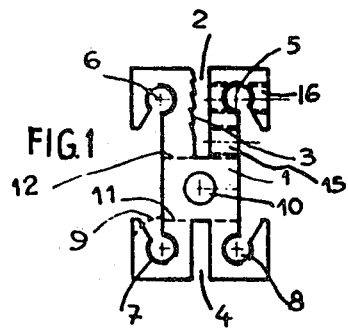
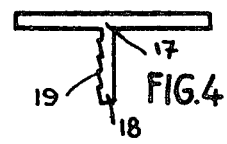
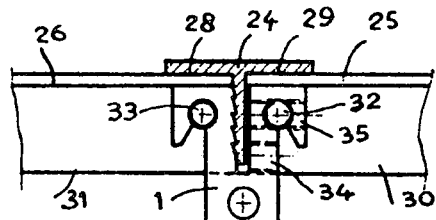
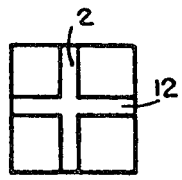
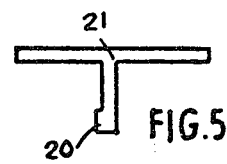
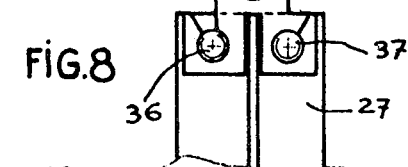
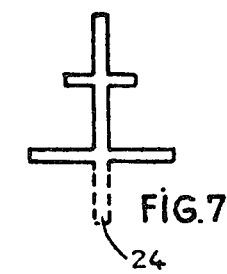
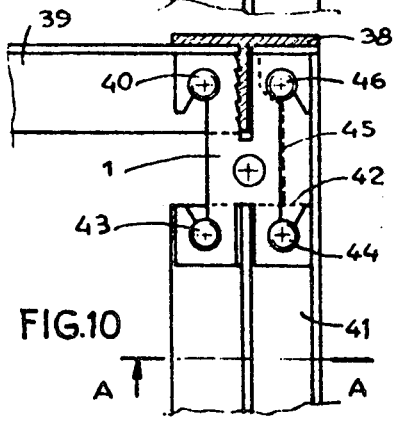
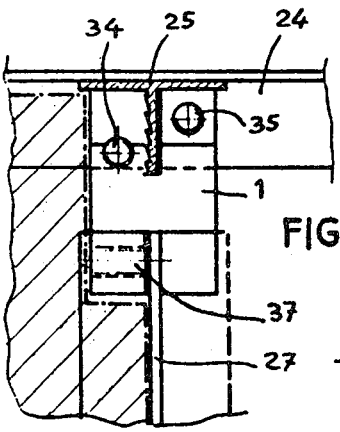
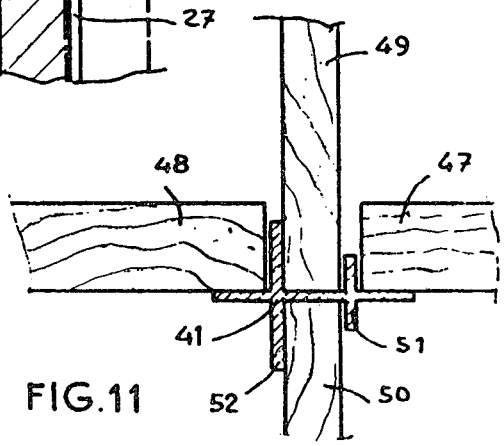

T-SECTION ASSEMBLY CONNECTOR

BACKGROUND OF THE INVENTION

The object of this invention is the assembly of T-section pieces intended for the construction of miscellaneous shelves.

Known devices of this kind generally employ angle-irons, perforated or non-perforated section pieces, round or square tubular, open or closed section pieces, most often requiring for their assembly several different elements depending upon the type of setup to be made.

SUMMARY OF THE INVENTION

The device according to the invention uses a single assembly element for all possible cases of mounting these T-section pieces. The assemblies therefore are extremely simple; the section piece cross-sections do not require any precision because they are invisible. The assembly element may be arranged anywhere on the section pieces.

The device which is the object of this invention involves four types of section pieces and a single assembly element. The first section piece, in the shape of a T, has larger dimensions than the others; it serves to make up the carrying framework, the three others can be used to support the levels or partitions. These section pieces, as well as the assembly pieces, may be made in various materials, such as iron, plastics, aluminum alloys. They are preferably obtained by extrusion.

BRIEF DESCRIPTION OF THE DRAWINGS

Other features and advantages of this invention will emerge better from the following description, given here with respect to the attached drawings supplied by way of nonrestrictive examples and they will give us a better understanding of the implementation of the invention.

FIG. 1 shows the assembly element in the extrusion direction.

FIG. 2 is a side right-hand, cross-section view of this same element.

FIG. 3 is a top view of this same element.

FIG. 4 is a cross-section of the T-section piece.

FIG. 5 is a cross-section of a variant of the section piece.

FIG. 6 is a cross-section of another variant of the section piece.

FIG. 7 is a cross-section of a section piece in the form of a Cross of Lorraine.

FIG. 8 shows an example of assembling T-section pieces.

FIG. 9 represents the view along F in FIG. 8.

FIG. 10 represents the assembly of a section piece in the shape of a Cross of Lorraine.

FIG. 11 shows a cross-section AA in FIG. 10, indicating the arrangement of the partitions and levels on a section piece in the form of a Cross of Lorraine.

DETAILED DESCRIPTION OF AN EXEMPLARY EMBODIMENT

As shown in FIG. 1, the assembly element for the T-section pieces or for the pieces in the form of a Cross of Lorraine involves the body 1, the slot 2 situated in the axis of the body 1, which is equipped on one of its faces with bevelled grooves 3, slot 4 having a length shorter than that of slot 2 but having the same width and corresponding to the thickness of the section piece, the four thread-cut holes 5, 6, 7, and 8, open over one-fifth of the circumference so as to simplify the threading. The dotted line 9 represents a variation in the shape of body 1. Hole 10 can be smooth or thread-screwed if it is necessary to attach a jack or a small wheel. The dotted lines 11 and 12 represent the bottom of two perpendicular slots.

The side view in FIG. 2 shows the slots 11 and 12 situated in the axis of body 1, the screw-threaded holes 15 and 16 coming out into the slot 2 of body 1. The top view in FIG. 3 completes the understanding of the assembly element.

FIG. 4 shows the T-section piece 17, carrying on the blade 18 the bevelled shoulders 19. These shoulders 19 correspond exactly to those three of slot 2 in body 1 of FIG. 1; two basin screws with six hollow surfaces, arranged in holes 15 and 16, as the section piece 17 is slid in the body of the assembly element, then line up the shoulders 3 and 19 against each other, thus at the same time providing for positioning, tightening, and the antiwarping of section piece 17.

FIG. 5 shows a variation of the antiwarping shoulder 20 on T-section piece 21.

FIG. 6 shows another shoulder variation on section piece 22; said section pieces consist of a series of grooves 23 with perpendicular edges which, in cooperation with the corresponding grooves of a variation of body 1, not shown here, guarantee the antiwarp of the section piece 22.

FIG. 7 shows a section piece in the shape of a Cross of Lorraine. One variation of this section piece consists in eliminating part 24 of the latter's core for the extremity mountings, involving a partition.

FIG. 8 shows an example of the assembly of section pieces 24, 25, 26 and 27 on body 1 of the assembly element. Section piece 24 is engaged in grooves 3 of slot 2 and is tightened by screws 34 and 35, not visible here; the section pieces 25 and 26 are supported at 28 and 29 against the interior of the T-bar 24; the blades 30 and 31 of the section pieces 25 and 26 are engaged in groove 12 of body 1 and are tightened by screws 32 and 33; however, the section piece 27, engaged in grooves 4 and 14 of body 1, is tightened by screws 36 and 37. With respect to the post 24, arranged vertically, the mounting plane of the shelves represented by the top of the blades of the section pieces 25, 26, and 27, may be situated on any level and may be adjusted for any setup by unscrewing the screws 32 and 33 which fasten the body 1 upon the post 24.

FIG. 9 shows the mounting in FIG. 8, along arrow F. The T-section piece 27 may be arranged either as shown in FIG. 8 or in another direction, the blade of the vertical T (FIG. 9), the T-bar, shown by the dotted line sic. One shelf, with the release, enabling it to avoid the assembly element 1, is shown by the dot-dash lines and cross-hatching.

FIG. 10 shows a mounting of an end with a section piece in the shape of a Cross of Lorraine according to FIG. 7 with at least part 24. It involves the vertical section piece 38, the assembly element 1, the section piece 39 fastened by the two screws 40, opposite each other, and the section piece in the shape of a Cross of Lorraine 41 which may be interrupted along the dots 42 and may be fastened by screws 43 and 44, or it may continue along the dotted line 45 and may also be held in place by screw 46.

FIG. 11 shows the arrangement of partitions and shelves along cross-section AA in FIG. 10 with the prolongation 24 shown in FIG. 7 of the section piece 41 which supports the shelves 47 and 48 and the partitions 49 and 50, simply placed between the blades 51 and 52 of the section piece 41.

I claim:

1. An assembly element, comprising a parallelepiped with respective pairs of first, second and third endfaces, two first slots, each first slot opening lengthwise into one of the first endfaces across at least a substantial portion of one dimension thereof, the first slots having a depth sufficient to receive and accommodate blade portions of a section piece adapted to be inserted therein, one of the first slots including a side surface shaped and adapted to form a mating portion to mate with a cooperating surface of the blade portion adapted to be inserted therein, four first threaded openings in the parallelepiped, each first opening extending therethrough parallel to the first slots and opening into both of the second endfaces thereof each of the openings being located between one of the first slots and one of the third endfaces, two second slots extending perpendicular to and intersecting the first slots, each second slot opening lengthwise into one of the first endfaces of the parallelpiped across the entire dimension thereof and into the third endfaces a distance corresponding to its depth, the second slots having a depth sufficient to receive and accommodate additional section pieces, two second threaded openings opening into one of the third endfaces and extending through the parallelepiped and opening into the surface of the first slot opposite the surface that includes the mating portion, the second openings being located on opposite sides of the second slot which intersects the first slot that includes the surface with the mating portion.

2. The assembly element in claim 1, wherein the first slots open lengthwise into the first endfaces across the entire distance of said one dimension thereof.

3. The assembly element in claim 1, wherein said mating portion includes a plurality of parallel grooves in said one side surface.

4. The assembly element in claim 1, wherein the first and second slots have the same depth.

5. The assembly element in claim 1, wherein a portion of each of the four first openings along the length thereof that represents less than half the circumference of the opening opens with the outer surface of the parallelepiped.

6. The assembly element in claim 1, and further including a single third opening extending through the parallelepiped midway between the first slots and parallel thereto.

* * * * *